May 29, 1951  G. E. DATH  2,554,561
FRICTION SHOCK ABSORBING MECHANISM
Filed Feb. 21, 1945
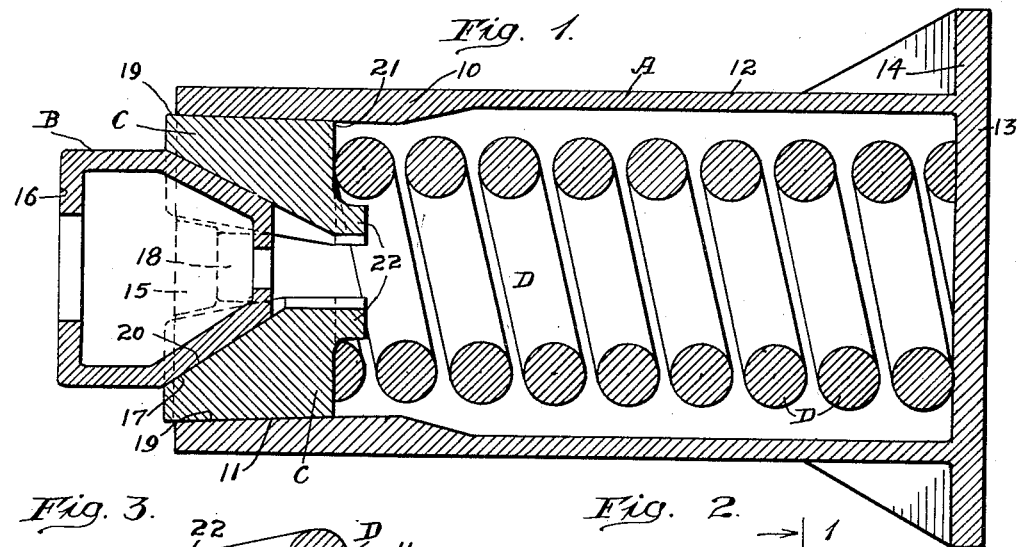
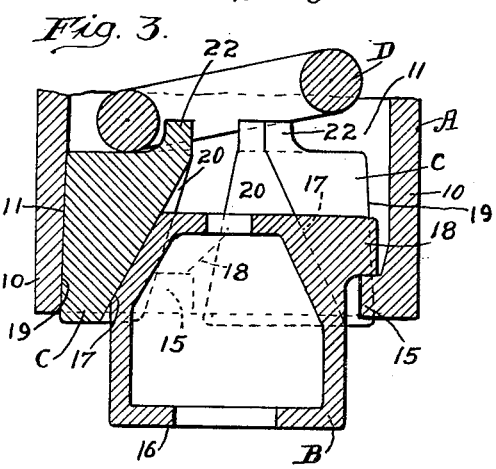
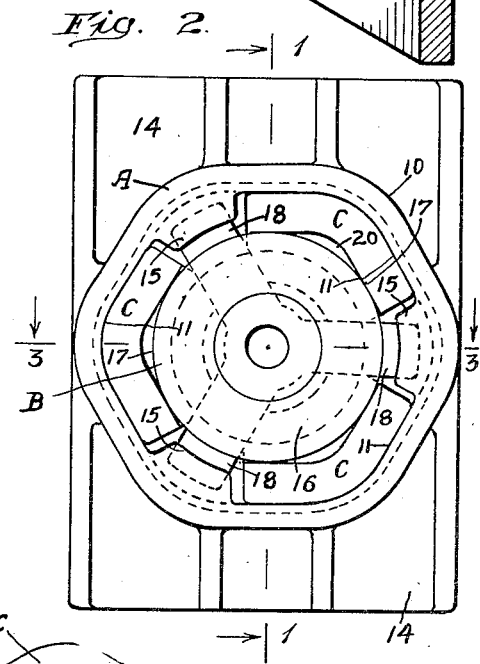
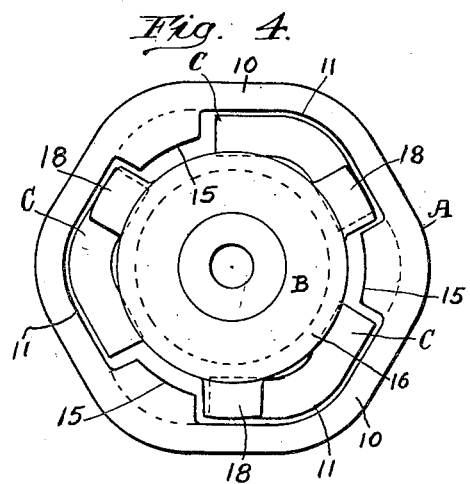
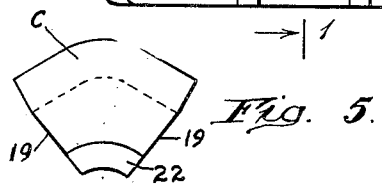
Inventor:
George E. Dath.
By Henry Fuchs
Atty.

Patented May 29, 1951

2,554,561

UNITED STATES PATENT OFFICE 2,554,561

FRICTION SHOCK ABSORBING MECHANISM

George E. Dath, Mokena, Ill., assignor to W. H. Miner, Inc., Chicago, Ill., a corporation of Delaware Application February 21, 1945, Serial No. 579,091

2 Claims. (Cl. 213—32)

This invention relates to improvements in friction shock absorbing mechanisms especially adapted for draft riggings of railway cars.

One object of the invention is to provide a friction shock absorbing mechanism comprising a friction casing, a friction clutch having sliding engagement with the casing, and spring resistance means yieldingly opposing movement of the clutch inwardly of the casing, wherein the clutch includes a central wedge block and friction shoes surrounding the block, and the friction shoes are provided with means for holding the spring resistance centered within the casing.

Another object of the invention is to provide in a friction shock absorbing mechanism, as set forth in the preceding paragraph, means for holding the parts of the mechanism assembled by shouldered engagement of the wedge with the casing, outward movement of the wedge being thus limited and the wedge, in turn, limiting outward movement of the shoes by its wedging engagement therewith.

A more specific object of the invention is to provide a friction shock absorbing mechanism comprising a friction casing; friction shoes slidingly telescoped within the casing; a central pressure transmitting block having wedging engagement with the shoes for spreading the same apart, and a helical coil spring within the casing yieldingly resisting inward movement of the shoes, wherein the shoes are provided with centering means in the form of a boss formed partly on each shoe and engaging within the coil spring to hold the same properly centered within the casing.

Other objects of the invention will more clearly appear from the description and claims hereinafter following.

In the drawing forming a part of this specification, Figure 1 is a longitudinal, vertical sectional view of a friction shock absorbing mechanism, illustrating my improvements in connection therewith, said view corresponding substantially to the line 1—1 of Figure 2. Figure 2 is a front elevational view of Figure 1, looking from left to right in said figure. Figure 3 is a horizontal sectional view of the front end portion of the mechanism, corresponding substantially to the line 3—3 of Figure 2. Figure 4 is a view similar to Figure 2 of the front end portion of the mechanism, illustrating the manner of assembling the same. Figure 5 is a rear elevational view of one of the friction shoes of my improved mechanism looking from right to left in Figure 1.

As shown in the drawing, my improved friction shock absorbing mechanism comprises broadly a combined friction shell and spring cage A; a wedge block B having anchoring means in shouldered engagement with the combined shell and cage A; three friction shoes C—C—C having spring centering projections thereon; and a spring D opposing inward movement of the shoes and centered by the projections of said shoes.

The combined friction shell and spring cage A is in the form of a casing of hexagonal, transverse cross section having the friction shell section 10 thereof formed at the forward end, which is open. The friction shell 10 presents three interior friction surfaces 11—11—11 which are of V-shaped transverse cross section, each V-shaped surface being formed by two adjacent inner faces of the hexagonal shell. The friction surfaces 11—11—11 converge inwardly of the casing, thereby presenting a tapered friction shell portion. Rearwardly of the friction shell proper 10, the casing A is formed with a spring cage section 12. The spring cage section 12 is closed at its rear end by a vertical wall 13, which is extended laterally outwardly of the casing and suitably reenforced to function as a rear follower 14, which is adapted to cooperate with the usual rear stops of the railway draft rigging. At the forward or open end thereof, the casing is provided with three inturned stop lugs 15—15—15, which are equally spaced circumferentially of said open end. The stop lugs 15—15—15 provide means for limiting outward movement of the wedge B and holding the mechanism assembled.

The wedge B is in the form of a hollow block of generally cylindrical shape having a vertically extending, flat, front end face 16 adapted to bear on the usual front follower of the railway draft rigging and receive the actuating force. At the inner end, the block B is provided with three wedge faces 17—17—17 which are arranged symmetrically about the central longitudinal axis of the mechanism and converge rearwardly. Each wedge face 17 is of V-shaped, transverse cross section and cooperates with one of the friction shoes C. At the rear end thereof, the block B has three radially projecting lugs or fingers 18—18—18 which cooperate with the inturned stop lugs 15—15—15 of the casing. The lugs 18 are alternated with the wedge faces 17 of the block, each lug extending between two adjacent shoes C—C, thereby holding the wedge block against rotation with respect to the shoes and limiting outward movement of the wedge by engagement with the corresponding lug 15 of the casing A.

The friction shoes C—C—C, which are three in number, surround the wedge block B and are slidingly telescoped within the casing A. Each shoe C has a longitudinally extending friction surface 19 on the outer side thereof which is of V-shaped, transverse cross section and engages with one of the V-shaped friction surfaces 11 of the casing. On the inner side, that is, the side of the shoe nearest the central axis of the mechanism, each shoe, has a wedge face 20 of V-shaped, transverse cross section, correspondingly inclined to and engaging with one of the V-shaped wedge faces 17 of the wedge block B. At the rear end, each shoe presents a flat, transverse face 21, which forms an abutment for the spring resistance D. Projecting rearwardly from the face 21, at the inner side of each shoe C, is an arcuate lug 22, which is adapted to engage within the front end of the spring D. The lugs 22—22—22 of the three shoes are disposed about the central longitudinal axis of the mechanism and together form, in effect, a cylindrical centering boss for the spring D.

The spring D comprises a single, relatively heavy, helical coil having its front and rear ends bearing respectively on the flat abutment faces 21 of the shoes and the vertical rear wall 13 of the casing A. The three lugs 22—22—22 of the shoes C—C—C project into the front end of the coil spring D, as most clearly illustrated in Figure 1 to center the spring with respect to the casing A. In the assembled condition of the mechanism, the spring D is preferably under a predetermined initial compression.

In assembling the mechanism, the spring D and the friction shoes C—C—C are first placed within the casing A. The parts are then compressed by forcing the shoes inwardly until the front ends of the shoes reach a position rearwardly of the lugs 15—15—15 of the casing A, the shoes being displaced with respect to the lugs to such an extent that there is sufficient clearance for the wedge block B to be freely rotated to engage the lugs 18—18—18 thereof in back of the lugs of the casing. While the parts are held thus compressed by any suitable tool, the wedge B is assembled with the casing A, the wedge having been first turned to the position shown in Figure 4 so that the lugs 18—18—18 thereof will clear the lugs 15—15—15 of the casing and pass between the same. The wedge B is forced inwardly of the casing to bring the lugs 18—18—18 in back of the lugs 15—15—15 and rotated to the position shown in Figure 2 to bring the lugs in alignment with the lugs 15. The pressure is then removed from the shoes, permitting the mechanism to expand and bringing the shoes into wedging engagement with the wedge faces of the block B, the lugs of which are forced into shouldered engagement with the lugs 15 of the casing.

The operation of my improved friction shock absorbing mechanism is as follows: Upon the mechanism being compressed by relative approach of the usual followers of the draft rigging, the wedge B is forced inwardly or rearwardly of the casing A, thereby setting up a wedging action between the wedge and the friction shoes, spreading the latter apart and forcing the same into tight frictional engagement with the friction surfaces of the casing and sliding the same inwardly of the casing against the resistance of the spring D. High frictional resistance is thus provided during the entire compression stroke of the mechanism. When the mechanism has been fully compressed, the usual front follower of the draft rigging engages the front end of the casing A, the latter acting as a pressure transmitting column, thus preventing undue compression of the spring resistance D. Upon the actuating force being removed, the expansive action of the spring D returns the parts to the normal full release position shown in Figure 1, outward movement of the wedge B being limited by shouldered engagement with the stop lugs 15—15—15 of the casing A and outward movement of the shoes, in turn, being limited by their engagement with the wedge block B.

From the preceding description taken in connection with the drawings, it will be evident that when my friction shock absorbing mechanism has been completely assembled, the wedge is effectively locked against rotation with respect to the casing A, thereby eliminating all danger of the lugs of the wedge becoming disengaged from the lugs of the casing A, the wedge being held against rotation by the stop lugs thereof being confined between adjacent shoes, and the shoes being held against rotation with respect to the casing by the interengaging V-shaped formation of the cooperating friction surfaces thereof.

I claim:

1. In a friction shock absorbing mechanism, the combination with a friction casing open at one end; of a friction clutch slidable within the casing including a wedge block and friction shoes surrounding said wedge; one helical coil spring member only within the casing opposing inward movement of said shoes; and a rearwardly extending centering projection on each shoe engaged within the corresponding end of said spring, the centering projections of said shoes being concentrically disposed with respect to the central longitudinal axis of the mechanism.

2. In a friction shock absorbing mechanism, the combination with a friction casing open at one end; of a friction clutch slidable within the casing including a wedge block and three friction shoes surrounding said block; one helical coil spring member only within the casing yieldingly opposing inward movement of said shoes; and an arc-shaped, rearwardly projecting, centering lug on each shoe engaged within the corresponding end of said spring, said arc-shaped centering lugs of the three shoes being concentric.

GEORGE E. DATH.

REFERENCES CITED

The following references are of record in the file of this patent:

UNITED STATES PATENTS

| Number | Name | Date |
| --- | --- | --- |
| 707,820 | Bush | Aug. 26, 1902 |
| 1,337,003 | Courson | Apr. 13, 1920 |
| 1,442,893 | Lewis | Jan. 23, 1923 |
| 1,989,157 | Schmidt | Jan. 29, 1935 |
| 2,077,966 | Spence et al. | Apr. 20, 1937 |
| 2,079,088 | Spence | May 4, 1937 |
| 2,331,458 | Dath | Oct. 12, 1943 |
| 2,335,847 | Dath | Dec. 7, 1943 |
| 2,421,075 | Lehman | May 27, 1947 |
| 2,423,876 | Dath | July 15, 1947 |
| 2,452,108 | Dath | Oct. 26, 1948 |

FOREIGN PATENTS

| Number | Country | Date |
| --- | --- | --- |
| 4,120 of 1913 | England | Feb. 18, 1914 |